United States Patent
Wei

(10) Patent No.: US 11,376,961 B2
(45) Date of Patent: Jul. 5, 2022

(54) METHOD AND SYSTEM FOR DEMONSTRATING FUNCTION OF VEHICLE-MOUNTED HEADS UP DISPLAY, AND COMPUTER-READABLE STORAGE MEDIUM

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 140 days.

(21) Appl. No.: 16/758,132

(22) PCT Filed: Apr. 2, 2019

(86) PCT No.: PCT/CN2019/080960
§ 371 (c)(1),
(2) Date: Apr. 22, 2020

(87) PCT Pub. No.: WO2019/218789
PCT Pub. Date: Nov. 21, 2019

(65) Prior Publication Data
US 2020/0282833 A1    Sep. 10, 2020
US 2021/0260997 A9    Aug. 26, 2021

(30) Foreign Application Priority Data

May 14, 2018 (CN) .......................... 201810453847.3

(51) Int. Cl.
*B60K 35/00* (2006.01)
*B60K 37/04* (2006.01)
(Continued)

(52) U.S. Cl.
CPC .............. *B60K 35/00* (2013.01); *G06V 20/20* (2022.01); *B60K 2370/1529* (2019.05); *B60K 2370/16* (2019.05); *B60K 2370/193* (2019.05)

(58) Field of Classification Search
CPC ............................ G06K 9/00671; B60K 37/04
See application file for complete search history.

(56) References Cited

U.S. PATENT DOCUMENTS 9,251,715 B2    2/2016  Hing et al.
2011/0183301 A1  7/2011  Turner
(Continued)

FOREIGN PATENT DOCUMENTS

CN    102427541 A    4/2012
CN    103688288 A    3/2014
(Continued)

OTHER PUBLICATIONS

PCT International Search Report, Application No. PCT/CN2019/080960, dated Jun. 11, 2019, 6 pages: with English translation.
(Continued)

*Primary Examiner* — Yi Yang
(74) *Attorney, Agent, or Firm* — Armstrong Teasdale LLP

(57) ABSTRACT

Method and system for demonstrating a function of a vehicle-mounted heads up display are disclosed. The method includes setting a projection region for displaying a first image, obtaining relative position and relative size relationships between the projection region and the virtual display region, projecting the first image in the projection region, capturing a second image of the first image, generating a virtual recognition region in the second image, determining whether an object in the second image is located within the virtual recognition region, and determining, in a case that the object is located within the virtual recognition region, a first position of the object within the
(Continued)

virtual recognition region, determining, based on the first position, a display position of a virtual marker representative of the object within the virtual display region, and displaying the virtual marker at the display position within the virtual display region.

11 Claims, 6 Drawing Sheets

(51) Int. Cl.
  *B60K 37/02* (2006.01)
  *G06V 20/20* (2022.01)

(56) References Cited

U.S. PATENT DOCUMENTS

2014/0160301 A1* 6/2014 Tan ............... H04N 9/3185
  348/191
2014/0272812 A1* 9/2014 Hing ............... G09B 9/04
  434/69
2017/0269363 A1* 9/2017 Fujita ............... H04N 5/225
2018/0109751 A1* 4/2018 Choi ............... G06F 1/1694

FOREIGN PATENT DOCUMENTS

| CN | 104504960 A | 4/2015 |
| CN | 205232340 U | 5/2016 |
| CN | 107107834 A | 8/2017 |
| CN | 108528341 A | 9/2018 |
| JP | H08160846 A | 6/1996 |
| JP | H0922245 A | 1/1997 |
| JP | 2017102331 A | 6/2017 |

OTHER PUBLICATIONS

PCT Written Opinion, Application No. PCT/CN2019/080960, dated Jun. 11, 2019, 6 pages.: with English translation of relevant part.
China First Office Action, Application No. 201810453847.3, dated Apr. 28, 2020, 11 pps.: with English translation.

* cited by examiner

METHOD AND SYSTEM FOR DEMONSTRATING FUNCTION OF VEHICLE-MOUNTED HEADS UP DISPLAY, AND COMPUTER-READABLE STORAGE MEDIUM

CROSS REFERENCE TO RELATED APPLICATIONS

This patent application is a National Stage Entry of PCT/CN2019/080960 filed on Apr. 2, 2019, which claims the benefit and priority of Chinese Patent Application No. 201810453847.3 filed on May 14, 2018, the disclosures of which are incorporated by reference herein in their entirety as part of the present application.

BACKGROUND

Embodiments of the present disclosure relate to the field of vehicle-mounted heads up display technologies, and more particularly, to a method for demonstrating a function of a vehicle-mounted heads up display.

At present, with the rapid development of automotive intelligent devices, heads up display (HUD) is increasingly used in automobiles. The heads up display on the automobiles may be installed on dashboards of the automobiles, to project in real time important driving information, such as speed, engine revolutions, fuel consumption, tire pressure, navigation, and information about external smart devices, onto windscreens in the form of text and/or icon by using the principle of optical reflection. Generally, the height of an image projected onto the windscreens is approximately on the same level as a driver's eyes, such that the driver can see the driving information without lowering his/her head, thereby avoiding distracting attention to the road ahead. Therefore, driving safety may be greatly improved.

BRIEF DESCRIPTION

Embodiments of the present disclosure provide a method and a system for demonstrating a function of a vehicle-mounted heads up display, and a computer-readable storage medium.

An aspect of the present disclosure provides a method for demonstrating a function of a vehicle-mounted heads up display. The method includes setting a projection region for displaying a first image, wherein the projection region overlaps a virtual display region of the vehicle-mounted heads up display, obtaining relative position and relative size relationships between the projection region and the virtual display region, projecting the first image in the projection region, the first image including one or more objects to be marked in the virtual display region, capturing a second image, wherein the second image is an image of the projection region containing the first image, generating a virtual recognition region in the second image based on the relative position and relative size relationships, determining whether an object in the second image is located within the virtual recognition region, and determining, in a case that the object is located within the virtual recognition region, a first position of the object within the virtual recognition region, determining, based on the first position, a display position of a virtual marker representative of the object within the virtual display region, and displaying the virtual marker at the display position within the virtual display region.

In an exemplary embodiment of the method for demonstrating the function of the vehicle-mounted heads up display, generating a virtual recognition region in the second image includes making relative position and relative size relationships between the second image and the virtual recognition region to be the same as the relative position and relative size relationships between the projection region and the virtual display region.

In an exemplary embodiment of the method for demonstrating the function of the vehicle-mounted heads up display, shapes of the projection region and the virtual display region are rectangles, a bottom edge of the projection region coincides with a bottom edge of the virtual display region, and a center of the bottom edge of the projection region coincides with a center of the bottom edge of the virtual display region. Obtaining the relative position and relative size relationships between the projection region and the virtual display region includes establishing a first coordinate system such that an abscissa axis of the first coordinate system coincides with the bottom edge of the projection region, and an ordinate axis of the first coordinate system passes through the center of the bottom edge of the projection region, respectively determining coordinates of a first endpoint and a second endpoint of a top edge of the projection region in the first coordinate system, respectively determining coordinates of a third endpoint and a fourth endpoint of a top edge of the virtual display region in the first coordinate system, and determining a ratio r1 of a length of the top edge of the projection region to a length of the top edge of the virtual display region and a ratio r2 of a length of a side edge of the projection region to a length of a side edge of the virtual display region.

In an exemplary embodiment of the method for demonstrating the function of the vehicle-mounted heads up display, the coordinates of the third endpoint and the fourth endpoint of the top edge of the virtual display region are as follows:

$$X_C = -s*\tan(\alpha/2), Y_C = 2s*\tan(\beta/2);$$

$$X_D = s*\tan(\alpha/2), Y_D = 2s*\tan(\beta/2);$$

wherein $X_C$ and $Y_C$ respectively represent an abscissa and an ordinate of the third endpoint, $X_D$ and $Y_D$ respectively represent an abscissa and an ordinate of the fourth endpoint, s represents a distance from a view window center of the vehicle-mounted heads up display to the projection region, and $\alpha$ and $\beta$ respectively represent a horizontal angle of view and a vertical angle of view of the vehicle-mounted heads up display.

In an exemplary embodiment of the method for demonstrating the function of the vehicle-mounted heads up display, generating a virtual recognition region in the second image includes establishing a second coordinate system such that an abscissa axis of the second coordinate system coincides with a bottom edge of the second image, and an ordinate axis of the second coordinate system passes through a center of the bottom edge of the second image, determining a pixel distance d1 between two endpoints of a top edge of the second image and a pixel distance d2 between two endpoints of a side edge of the second image, and defining a length of a top edge of the virtual recognition region as d1/r1 and defining a length of a side edge of the virtual recognition region as d2/r2, such that coordinates of two endpoints of the top edge of the virtual recognition region in the second coordinate system are (−d1/2r1, d2/r2) and (d1/2r1, d2/r2) respectively, and coordinates of two endpoints of a bottom edge of the virtual recognition region in the second coordinate system are (−d1/2r1, 0) and (d1/2r1, 0) respectively.

In an exemplary embodiment of the method for demonstrating the function of the vehicle-mounted heads up display, a ratio of an abscissa of the display position of the virtual marker in the virtual display region in the first coordinate system to the top edge of the virtual display region is equal to a ratio of an abscissa of the first position in the second coordinate system to the top edge of the virtual recognition region, and a ratio of an ordinate of the display position of the virtual marker in the virtual display region in the first coordinate system to the side edge of the virtual display region is equal to a ratio of an ordinate of the first position in the second coordinate system to the side edge of the virtual recognition region.

In an exemplary embodiment of the method for demonstrating the function of the vehicle-mounted heads up display, the first image is an image displaying a road condition.

In an exemplary embodiment of the method for demonstrating the function of the vehicle-mounted heads up display, the object includes at least one of a vehicle, a pedestrian or a guidepost.

Another aspect of the present disclosure provides a system for demonstrating a function of a vehicle-mounted heads up display. The system includes at least one processor, and at least one memory storing a computer program code. The computer program code, when executed by the at least one processor, enables the system to set a projection region for displaying a first image, wherein the projection region overlaps a virtual display region of the vehicle-mounted heads up display, obtain relative position and relative size relationships between the projection region and the virtual display region, project the first image in the projection region, the first image including one or more objects to be marked in the virtual display region, capture a second image, wherein the second image is an image of the projection region containing the first image, generate a virtual recognition region in the second image based on the relative position and relative size relationships, determine whether an object in the second image is located within the virtual recognition region, and determine, in a case that the object is located within the virtual recognition region, a first position of the object within the virtual recognition region, determine, based on the first position, a display position of a virtual marker representative of the object within the virtual display region, and display the virtual marker at the display position within the virtual display region.

In an exemplary embodiment of the system for demonstrating the function of the vehicle-mounted heads up display, the computer program code, when executed by the at least one processor, enables the system to generate a virtual recognition region in the second image by making relative position and relative size relationships between the second image and the virtual recognition region to be the same as the relative position and relative size relationships between the projection region and the virtual display region.

In an exemplary embodiment of the system for demonstrating the function of the vehicle-mounted heads up display, shapes of the projection region and the virtual display region are rectangles, a bottom edge of the projection region coincides with a bottom edge of the virtual display region, and a center of the bottom edge of the projection region coincides with a center of the bottom edge of the virtual display region. The computer program code, when executed by the at least one processor, enables the system to obtain the relative position and relative size relationships between the projection region and the virtual display region by establishing a first coordinate system such that an abscissa axis of the first coordinate system coincides with the bottom edge of the projection region, and an ordinate axis of the first coordinate system passes through the center of the bottom edge of the projection region respectively determining coordinates of a first endpoint and a second endpoint of a top edge of the projection region in the first coordinate system, respectively determining coordinates of a third endpoint and a fourth endpoint of a top edge of the virtual display region in the first coordinate system, and determining a ratio r1 of a length of the top edge of the projection region to a length of the top edge of the virtual display region and a ratio r2 of a length of a side edge of the projection region to a length of a side edge of the virtual display region.

In an exemplary embodiment of the system for demonstrating the function of the vehicle-mounted heads up display, the coordinates of the third endpoint and the fourth endpoint of the top edge of the virtual display region are as follows:

$$X_C = -s*\tan(\alpha/2), Y_C = 2s*\tan(\beta/2);$$

$$X_D = s*\tan(\alpha/2), Y_D = 2s*\tan(\beta/2);$$

wherein $X_C$ and $Y_C$ respectively represent an abscissa and an ordinate of the third endpoint, $X_D$ and $Y_D$ respectively represent an abscissa and an ordinate of the fourth endpoint, s represents a distance from a view window center of the vehicle-mounted heads up display to the projection region, and $\alpha$ and $\beta$ respectively represent a horizontal angle of view and a vertical angle of view of the vehicle-mounted heads up display.

In an exemplary embodiment of the system for demonstrating the function of the vehicle-mounted heads up display, the computer program code, when executed by the at least one processor, enables the system to generate a virtual recognition region in the second image by establishing a second coordinate system such that an abscissa axis of the second coordinate system coincides with a bottom edge of the second image, and an ordinate axis of the second coordinate system passes through a center of the bottom edge of the second image, determining a pixel distance d1 between two endpoints of a top edge of the second image and a pixel distance d2 between two endpoints of a side edge of the second image, and defining a length of a top edge of the virtual recognition region as d1/r1 and defining a length of a side edge of the virtual recognition region as d2/r2, such that coordinates of two endpoints of the top edge of the virtual recognition region in the second coordinate system are (−d1/2r1, d2/r2) and (d1/2r1, d2/r2) respectively, and coordinates of two endpoints of a bottom edge of the virtual recognition region in the second coordinate system are (−d1/2r1, 0) and (d1/2r1, 0) respectively.

In an exemplary embodiment of the system for demonstrating the function of the vehicle-mounted heads up display, a ratio of an abscissa of the display position of the virtual marker in the virtual display region in the first coordinate system to the top edge of the virtual display region is equal to a ratio of an abscissa of the first position in the second coordinate system to the top edge of the virtual recognition region, and a ratio of an ordinate of the display position of the virtual marker in the virtual display region in the first coordinate system to the side edge of the virtual display region is equal to a ratio of an ordinate of the first position in the second coordinate system to the side edge of the virtual recognition region.

In an exemplary embodiment of the system for demonstrating the function of the vehicle-mounted heads up display, the first image is an image displaying a road condition.

In an exemplary embodiment of the system for demonstrating the function of the vehicle-mounted heads up display, the object includes at least one of a vehicle, a pedestrian or a guidepost.

Still another aspect of the present disclosure also provides a computer-readable storage medium storing a computer program code. The computer program code, when executed by a processor, carries out steps of the method for demonstrating the function of the vehicle-mounted heads up display according to any one of the embodiments of the present disclosure.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present application, in which.

Corresponding reference numerals indicate corresponding parts or features throughout the several views of the drawings.

DETAILED DESCRIPTION

Figure 1:
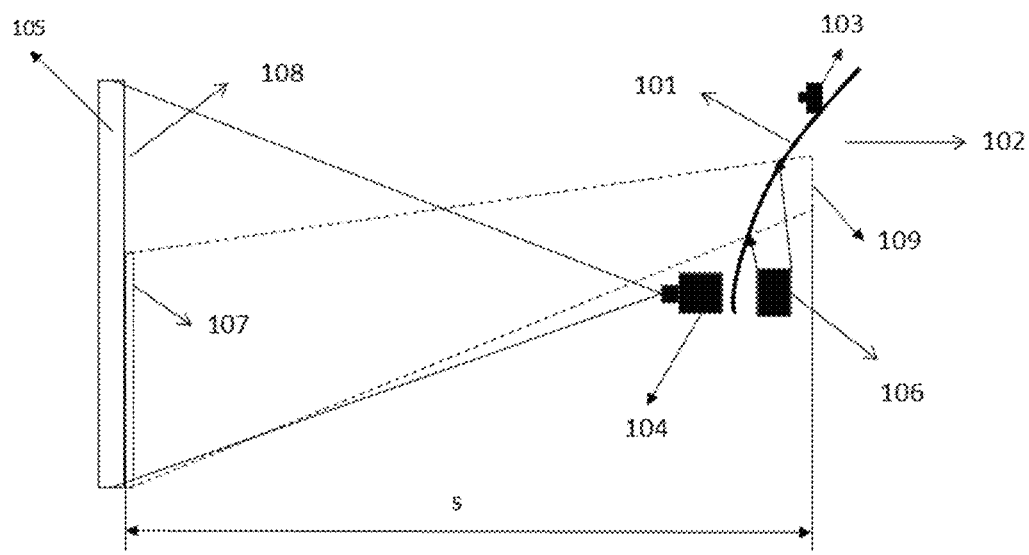
FIG. 1 illustrates a schematic diagram of an exemplary system for demonstrating a function of a vehicle-mounted heads up display.

Various embodiments will now be described in detail with reference to the drawings, which are provided as illustrative examples of the disclosure so as to enable those skilled in the art to practice the disclosure. The figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components will be omitted so as not to obscure the disclosure. Further, various embodiments encompass present and future known equivalents to the components referred to herein by way of illustration.

As used herein and in the appended claims, the singular form of a word includes the plural, and vice versa, unless the context clearly dictates otherwise. Thus, when a singular term is mentioned, it is generally inclusive of the plurals of the respective terms. Similarly, the words "comprise", "include" and grammatical variations thereof are to be interpreted inclusively rather than exclusively, unless such a construction is clearly prohibited from the context. The terms "first", "second" and "third" or the like are merely for description purposes, and are not construed as indicating or implying relative importance and formation order.

The flow diagrams depicted herein are just one example. There may be many variations to this diagram or the steps (or operations) described therein without departing from the spirit of the disclosure. For instance, the steps may be performed in a differing order or steps may be added, deleted, or modified. All of these variations are considered as a part of the claimed disclosure.

In addition to projecting important driving information onto a windscreen, the heads up display may also have a function of fusing road conditions with a virtual image of the heads up display (i.e., virtual-real fusion). As an example, in the case that a surrounding object (for example, a vehicle, a pedestrian, or a guidepost) enters a field of view of the heads up display, a virtual marker representative of the surrounding object is displayed at a position of the virtual image of the heads up display corresponding to a real position of the surrounding object, such that the fusion of the virtual image and the actual road conditions may be implemented.

An example manner of implementing the virtual-real fusion is as below. A camera is installed on a vehicle, when the vehicle is running on a real road (a real driving mode), the camera captures videos of surrounding road conditions in real time and transmits the captured videos to a processing unit of the HUD in real time, and the processing unit may recognize the position of an object in each frame of image of the videos. When the object is within the field of view of the HUD, a virtual marker is arranged at a position of the virtual image of the HUD corresponding to the real position of the object, such that the position of the virtual marker matches the real position of the object in the road.

In the real driving mode, since a field of view of the camera is relatively wide generally, the captured videos about the surrounding road conditions can relatively truly reveal the real road conditions. Therefore, the position of the virtual marker marked in the virtual image can better match the position of the object in the real road.

However, when a merchant carries out promotion and demonstration of the function of the HUD, because the promotion and demonstration are generally carried out in a fixed place, it is required to project the videos about the surrounding road conditions captured in advance onto a projection screen to simulate the real road conditions. FIG. 1 illustrates a schematic diagram of an exemplary system for demonstrating a function of a vehicle-mounted heads up display. As shown in FIG. 1, the exemplary system may include a simulated vehicle 102 having a front windscreen 101, a camera 103 arranged on the front windscreen 101, a projector 104 arranged in the front of the front windscreen 101, a projection screen 105 located at a certain distance in the front of the front windscreen 101 to receive an image projected by the projector 104, and a vehicle-mounted HUD 106 configured to project a virtual image containing driving information and road condition information onto the windscreen 101. During the promotion and demonstration, the projection screen 105 may overlap the virtual display region 107 of the virtual image of the HUD (as shown in FIG. 1). Here, the "virtual display region" may refer to a region where the virtual image is located when a driver observes the virtual image of the HUD through the front windscreen 101.

Due to the limitation of promotion and demonstration place, the size of the projection screen 105 cannot be too large, so the video image projected by the projector 104 cannot truly reveal the road condition information. In this case, the position of the virtual marker of an object marked in the virtual image may mismatch the position of the object in the projection screen 105. The mismatch may include such a fact as below: the driver observes that a certain vehicle in the projection screen 105 is clearly far away from the field of view of the virtual image of the HUD, but the virtual marker corresponding to the object still appears in the virtual image of the HUD; or the driver observes a pedestrian in the projection screen 105 has entered the field of view of the virtual image of the HUD, but there is no virtual marker marking the object in the virtual image of the HUD. In either case of mismatch, it will have a severely adverse impact on the driving experience.

The present disclosure provides a method for demonstrating a function of a vehicle-mounted heads up display. This method may enable a virtual marker displayed in a virtual image to match a real position of an object represented by the virtual marker, such that the driving experience may be improved.

Figure 2:
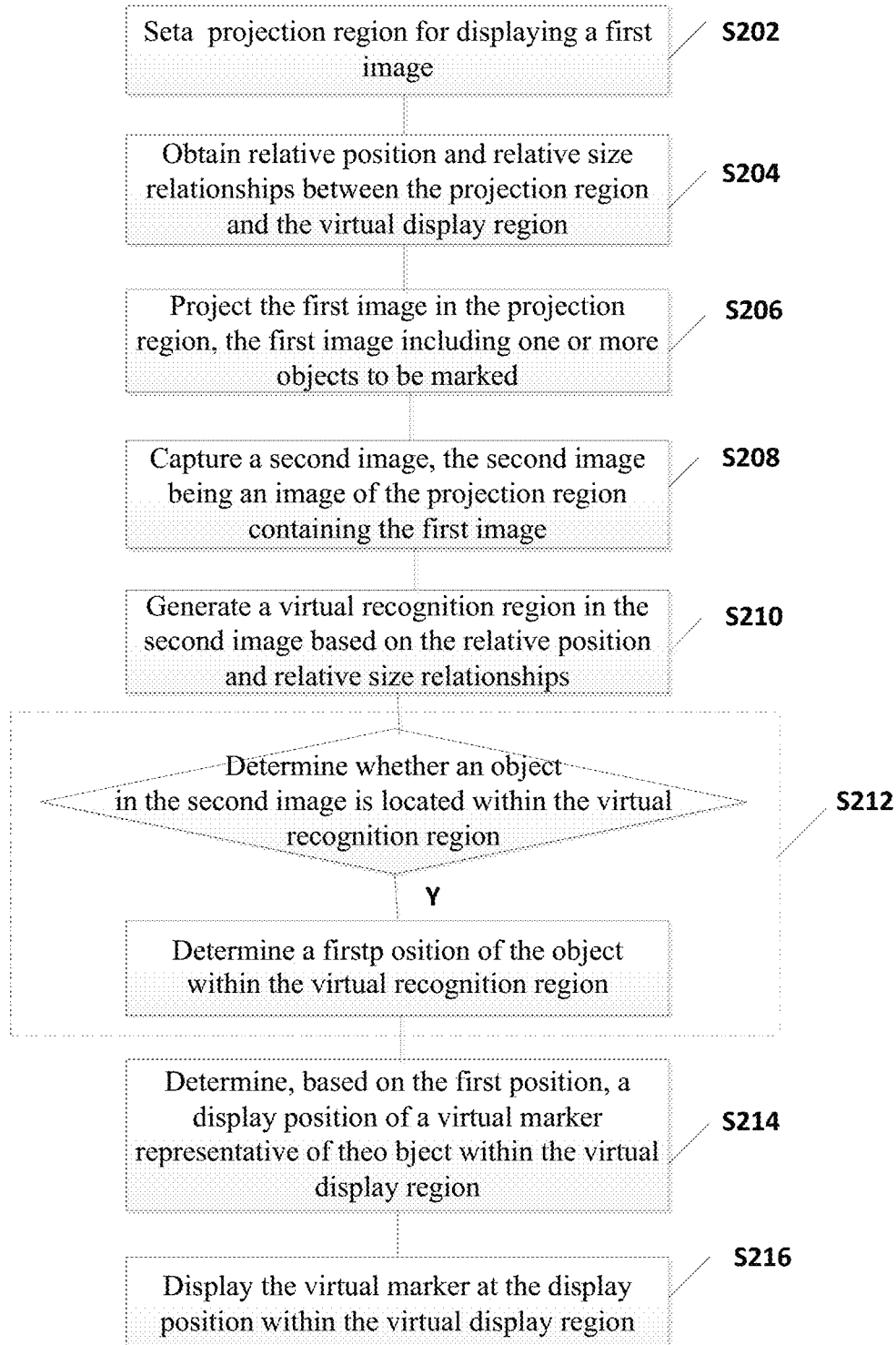
FIG. 2 illustrates a flowchart of a method for demonstrating a function of a vehicle-mounted heads up display according to an exemplary embodiment of the present disclosure.

FIG. 2 illustrates a flowchart of a method for demonstrating a function of a vehicle-mounted heads up display according to an exemplary embodiment of the present disclosure. As shown in FIG. 2, the method includes following steps:

S202: setting a projection region for displaying a first image, wherein the projection region overlaps a virtual display region of the vehicle-mounted heads up display;

S204: obtaining relative position and relative size relationships between the projection region and the virtual display region;

S206: projecting the first image in the projection region, wherein the first image includes one or more objects to be marked;

S208: capturing a second image, wherein the second image is an image of the projection region containing the first image;

S210: generating a virtual recognition region in the second image based on the relative position and relative size relationships;

S212: determining whether an object in the second image is located within the virtual recognition region, and determining, in a case that the object is located within the virtual recognition region, a first position of the object within the virtual recognition region;

S214: determining, based on the first position, a display position of a virtual marker representative of the object within the virtual display region; and S216: displaying the virtual marker at the display position within the virtual display region.

The steps of the above process are described in detail below with reference to FIG. 2 to FIG. 6.

In Step S202, a projection region 108 for displaying a first image 110 is set, such that the projection region 108 overlaps the virtual display region 107 of the vehicle-mounted heads up display 106. Herein, the area of the projection region 108 is not necessarily equal to that of the virtual display region 107 of the vehicle-mounted heads up display 106, so the term "overlap" may refer to partial overlapping. The overlapping may be understood as a fact that the distance between the projection region 108 and a human eye (the driver's eye) is equal to the distance (image distance) between a virtually displayed image and the human eye. It is to be understood that it is difficult for those skilled in the art to achieve absolute equal distances, and thus the overlapping may also allow a certain deviation.

In an exemplary embodiment, the first image 110 is an image showing road conditions, and specifically the first image may be a video image about the surrounding road conditions captured (for example, in advance or in real time) by a camera arranged on the vehicle in the real driving mode. The first image may include one or more frames of images. The first image 110 may include one or more objects around the vehicle that is running, for example, a vehicle, a pedestrian, or a guidepost.

In an exemplary embodiment, the projection region 108 refers to a region where road condition information is projected by the projector 104, which may be equal to or smaller than a region occupied by the projection screen.

In Step S204, a relative position relationship and a relative size relationship between the projection region (solid line frame) 108 and the virtual display region (dashed line frame) 107 may be obtained.

Figure 3:
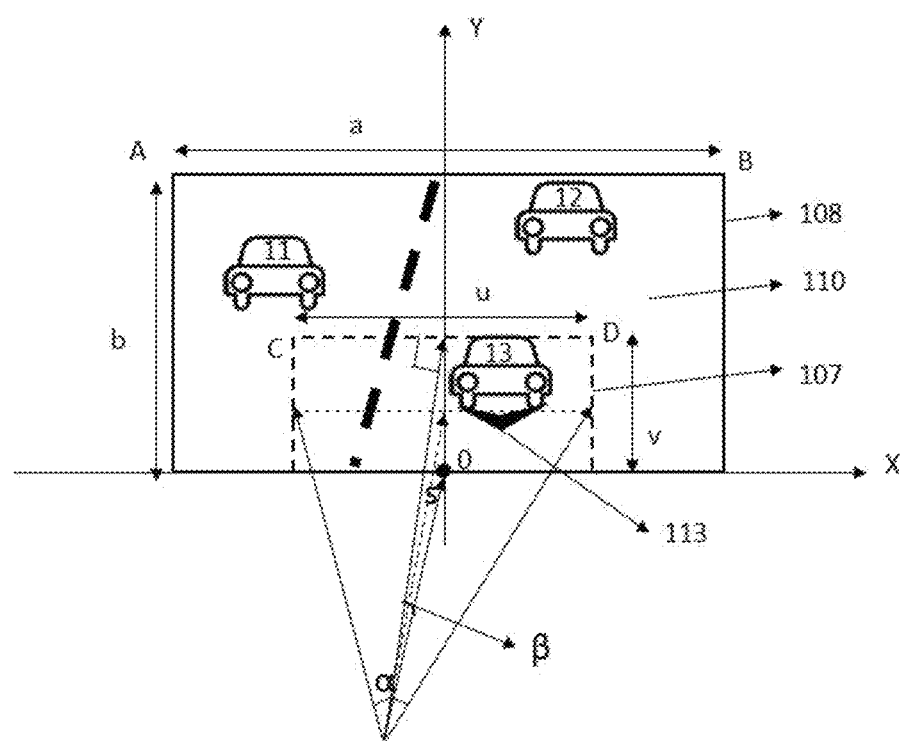
FIG. 3 illustrates a position relationship between a projection region and a virtual display region of the vehicle-mounted HUD according to an exemplary embodiment of the present disclosure.

FIG. 3 illustrates a position relationship between the projection region 108 and the virtual display region 107 of the vehicle-mounted HUD according to an exemplary embodiment of the present disclosure. In the embodiment shown in FIG. 3, shapes of the projection region 108 and the virtual display region 107 are rectangles. A bottom edge of the projection region 108 coincides with a bottom edge of the virtual display region 107, and a center of the bottom edge of the projection region 108 coincides with a center of the bottom edge of the virtual display region 107.

Figure 4:
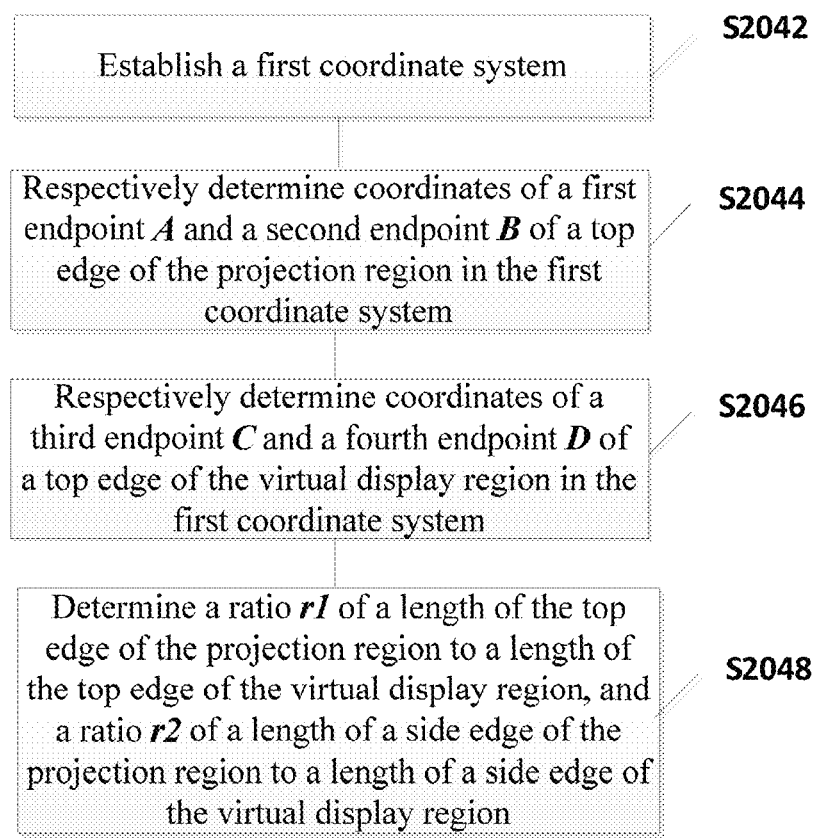
FIG. 4 illustrates a flowchart of obtaining relative position and relative size relationships between the projection region and the virtual display region according to an exemplary embodiment of the present disclosure.

FIG. 4 illustrates a flowchart of obtaining relative position and relative size relationships between the projection region 108 and the virtual display region 107 according to an exemplary embodiment of the present disclosure. As shown in FIG. 4, the relative position and relative size relationships between the projection region 108 and the virtual display region 107 may be obtained through Steps S2042-S2048.

In Step S2042, a first coordinate system (as shown in FIG. 3) is established such that an abscissa axis (X-axis) of the first coordinate system coincides with the bottom edge of the projection region 108 and also coincides with the bottom edge of the virtual display region 107, and an ordinate axis (Y-axis) of the first coordinate system passes through the center of the bottom edge of the projection region 108.

In Step S2044, coordinates of a first endpoint A and a second endpoint B of a top edge of the projection region 108 in the first coordinate system are respectively determined, i.e., A (−a/2, b) and B (a/2, b). Here, a and b respectively represent a length and a width of the projection region 108.

In Step S2046, coordinates of a third endpoint C and a fourth endpoint D of a top edge of the virtual display region 107 in the first coordinate system are respectively determined, i.e., $X_C = -s*\tan(\alpha/2)$, $Y_C = 2s*\tan(\beta/2)$, $X_D = s*\tan(\alpha/2)$, $Y_D = 2s*\tan(\beta/2)$, wherein $X_C$ and $Y_C$ respectively represent an abscissa and an ordinate of the third endpoint, $X_D$ and $Y_D$ respectively represent an abscissa and an ordinate of the fourth endpoint, s represents a distance from a view window 109 of the vehicle-mounted heads up display 106 to the projection region 108 (as shown in FIG. 1), and α and β respectively represent a horizontal angle of view and a vertical angle of view of the vehicle-mounted heads up display 106.

Therefore, based on the coordinates of the first endpoint A, the second endpoint B, the third endpoint C and the fourth endpoint D, the relative position relationship between the projection region 108 and the virtual display region 107 may be obtained.

In Step S2048, based on the coordinates of the third endpoint C and the fourth endpoint D, a length of the top edge CD of the virtual display region 107 may be determined as 2s*tan(α/2), and further a ratio of a length a of the top edge AB of the projection region 108 to the length of the top edge CD of the virtual display region 107 may be determined as r1=a/(2s*tan(α/2). Similarly, a ratio of a length of a side edge of the projection region to a length of a side edge of the virtual display region may be determined as r2=b/2s*tan(β/2). Thus, the relative size relationship between the projection region 108 and the virtual display region 107 may be determined.

In Step S206, the first image 110 prerecord during running on a real road may be projected onto the projection region 108. As an alternative embodiment, images about surrounding road conditions may be recorded in real time by driving a real vehicle to run on a road during a simulation demonstration, and the recorded images may be transmitted to a projector in the system shown in FIG. 1 in real time, such that the recorded images are projected onto the projection region 108 in real time.

As shown in FIG. 3, the first image 110 projected in the projection region 108 includes three vehicles (11, 12, and 13), wherein the vehicle 13 enters the virtual display region 107.

In Step S208, a second image 111 of the projection region 108 containing the first image 110 is captured. "The projection region 108 containing the first image 110" refers to the projection region 108 with the first image 110 projected thereon. In this step, as an example, the second image 111 of the projection region 108 may be captured by the camera 103 in the system as shown in FIG. 1. The second image 111 is exemplarily shown in a solid line frame in FIG. 5. The second image 111 may include the same objects as in the first image 110, for example, three vehicles 11', 12', 13'.

In Step S210, a virtual recognition region 112 is generated in the second image 111 based on the relative position and relative size relationships obtained in Step S204. In some embodiments of the present disclosure, the virtual recognition region 112 refers to a region in the second image for determining whether a virtual marker representative of the object needs to be displayed in the virtual display region 108, wherein the virtual recognition region 112 is shown in a dashed line frame in FIG. 5.

In an exemplary embodiment, the virtual recognition region 112 is generated in the second image 111, such that relative position and relative size relationships between the second image 111 and the virtual recognition region 112 are the same as the relative position and relative size relationships between the projection region 108 and the virtual display region 107. For example, a bottom edge of the second image 111 coincides with a bottom edge of the virtual recognition region 112, and a center of the bottom edge of the second image 111 coincides with a center of the bottom edge of the virtual recognition region 112. A ratio of a top edge (and/or the bottom edge) of the second image 111 to a top edge (and/or the bottom edge) of the virtual recognition region 112 is equal to r1, and a ratio of a side edge of the second image 111 to a side edge of the virtual recognition region 112 is equal to r2.

Figure 6:
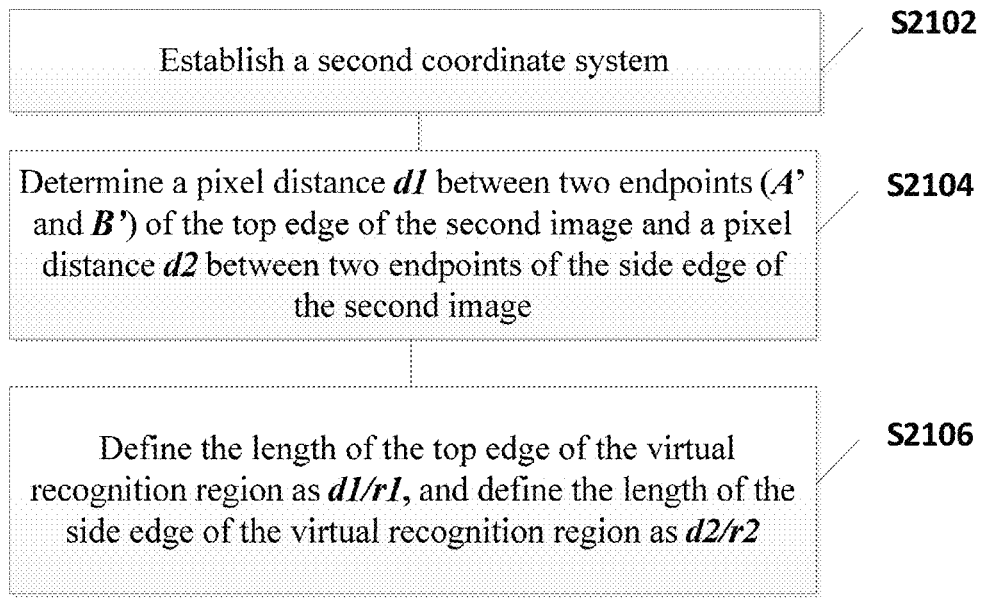
FIG. 6 illustrates a flowchart of generating a virtual recognition region in the second image according to an exemplary embodiment of the present disclosure.

FIG. 6 illustrates a flowchart of generating the virtual recognition region in the second image according to an exemplary embodiment of the present disclosure. As shown in FIG. 6, the virtual recognition region may be generated in the second image through Steps S2102-S2106.

Figure 5:
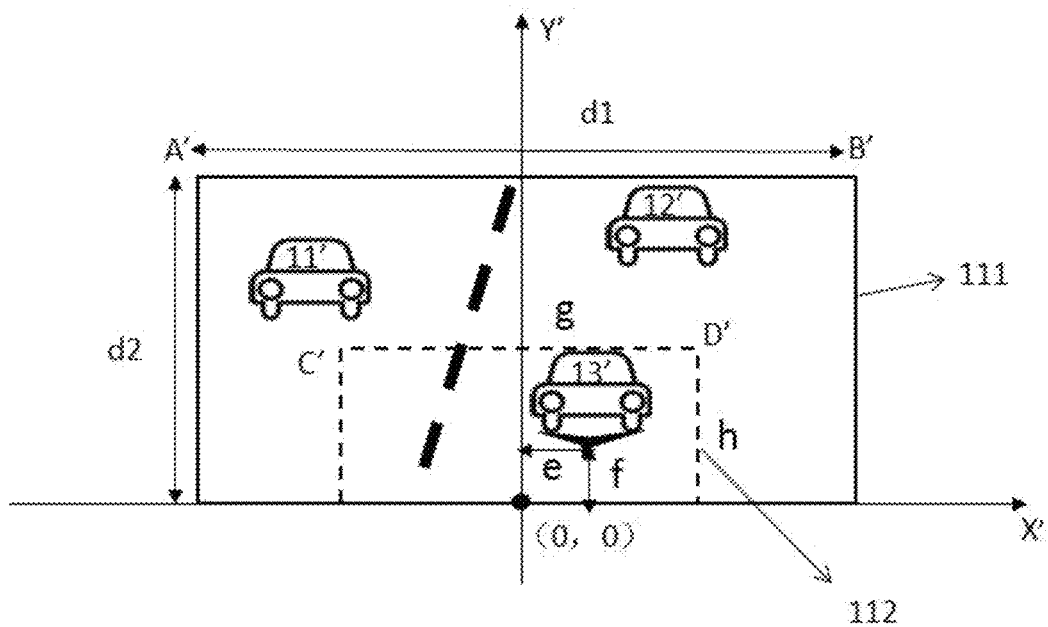
FIG. 5 illustrates a position relationship between a second image and a virtual recognition region according to an exemplary embodiment of the present disclosure.

In Step S2102, a second coordinate system (as shown in FIG. 5) is established, such that an abscissa axis X' of the second coordinate system coincides with the bottom edge of the second image 111, and an ordinate axis Y' of the second coordinate system passes through the center of the bottom edge of the second image 111.

In Step S2104, a pixel distance d1 between two endpoints (A' and B') of the top edge of the second image 111 and a pixel distance d2 between two endpoints of the side edge of the second image 111 are determined. As a non-limiting example, the pixel distance may be represented by the number of pixels passed through by a line segment (such as the line segment between two endpoints of the top edge of the second image 111, or the line segment between two endpoints of the side edge of the second image 111) on the second image.

In Step S2106, the length of the top edge of the virtual recognition region 112 is defined as d1/r1, and the length of the side edge of the virtual recognition region 112 is defined as d2/r2. On this basis, coordinates of two endpoints (C' and D') of the top edge of the virtual recognition region 112 in the second coordinate system may be obtained, i.e., C'(−d1/2r1, d2/r2) and D'(d1/2r1, d2/r2), and coordinates of two endpoints of the bottom edge of the virtual recognition region 112 in the second coordinate system may be obtained, i.e., (−d1/2r1, 0) and (d1/2r1, 0) respectively. In this way, the position and the size of the virtual recognition region 112 in the second image 111 may be determined.

In Step S212, it is determined whether an object in the second image 111 is located within the virtual recognition region 112, and in a case that the object is located within the virtual recognition region 112, a first position of the object within the virtual recognition region 112 is determined.

In this step, the second image 111 may be processed in order to recognize an object in the second image 111 and to determine whether the recognized object is located within the virtual recognition region 112. In the case that the object is located within the virtual recognition region 112, the first position of the object within the virtual recognition region 112 is obtained. As shown in FIG. 5, three vehicles 11', 12', and 13' in the second image 111 are recognized by processing the second image 111. However, after making a determination, only the vehicle 13' is located within the virtual recognition region. Therefore, only the position of the vehicle 13' is obtained (assuming that the position coordinate of the vehicle 13' is (e, f)), and neither the vehicle 11' nor the vehicle 12' is processed.

In Step 214, based on the first position (its coordinate in the second coordinate system is denoted as (e, f)) obtained in Step 212, a display position of a virtual marker 113 representative of the object (for example, a vehicle) within the virtual display region 107 is determined.

In an exemplary embodiment, the display position of the virtual marker 113 in the virtual display region 107 may be determined in such a way that a ratio of an abscissa of the display position of the virtual marker 113 in the virtual display region 107 in the first coordinate system to the top edge of the virtual display region 107 is equal to a ratio of an abscissa of the first position in the second coordinate system to the top edge of the virtual recognition region 112, and a ratio of an ordinate of the display position of the virtual marker 113 in the virtual display region 107 in the first coordinate system to the side edge of the virtual display region 107 is equal to a ratio of an ordinate of the first position in the second coordinate system to the side edge of the virtual recognition region 112.

However, the relationship between the coordinates of the display position of the virtual marker in the virtual display region 107 and the coordinates of the object in the virtual recognition region 112 is not limited to the embodiments set forth herein, which does not constitute a limitation to the present disclosure. As an example, after the first position of the object within the virtual recognition region 112 is determined, an approximate coordinate of the display position may be determined such that the ratio of the abscissa of the approximate coordinate to the top edge of the virtual display region 107 is equal to the ratio of the ordinate of the first position to the top edge of the virtual recognition region 112, and the ratio of the ordinate of the approximate coordinate to the side edge of the virtual display region 107 is equal to the ratio of the ordinate of the first position to the side edge of the virtual recognition region 112. Next, a position within a predetermined range of the approximate coordinate may be determined as the display position.

By way of example, assuming that lengths of the top edge and the side edge of the virtual display region 107 are respectively u and v (as shown in FIG. 3), lengths of the top edge and the side edge of the virtual recognition region 112 are respectively g and h (as shown in FIG. 5), and the coordinate of the first position of the object in the virtual recognition region 112 is (e, f), the abscissa and the ordinate of the display position of the virtual marker 113 within the virtual display region 107 may be determined as $e/g \cdot u$ and $f/h \cdot v$, respectively.

In Step 214, the virtual marker 113 is displayed in the display position within the virtual display region 107. The virtual marker 113 may be indicated by an arrow as shown in FIG. 3. However, the shape of the virtual marker employed herein is merely exemplary, and it is not intended to limit the scope of the present disclosure to be this specific shape. By virtue of this example, those skilled in the art may appropriately select other suitable shapes for the virtual marker as needed.

In the vehicle-mounted HUD technologies, the virtual image generally is an enlarged image of an image source projected onto the front windscreen after multiple reflections. In order to enable the virtual marker to be displayed in the display position within the virtual display region, it is needed to determine the corresponding position of the virtual marker in the image source. However, how to determine the position of the virtual marker in the image source according to the position of the virtual marker to be marked in the virtual display region is not specifically limited in the present disclosure. Those skilled in the art may select an appropriate method to determine the position of the virtual marker in the image source according to the structural composition of the HUD and the number of reflections of the image source for forming the virtual image.

According to the method for demonstrating a function of a vehicle-mounted heads up display provided by the embodiments of the present disclosure, the virtual marker 113 may be displayed, in real time, in a position in the virtual display region 107 of the HUD corresponding to the object, such that the virtual marker 113 matches the real position of the object, thereby achieving a better virtual-real fusion. Therefore, the driving experience may be improved.

Figure 7:
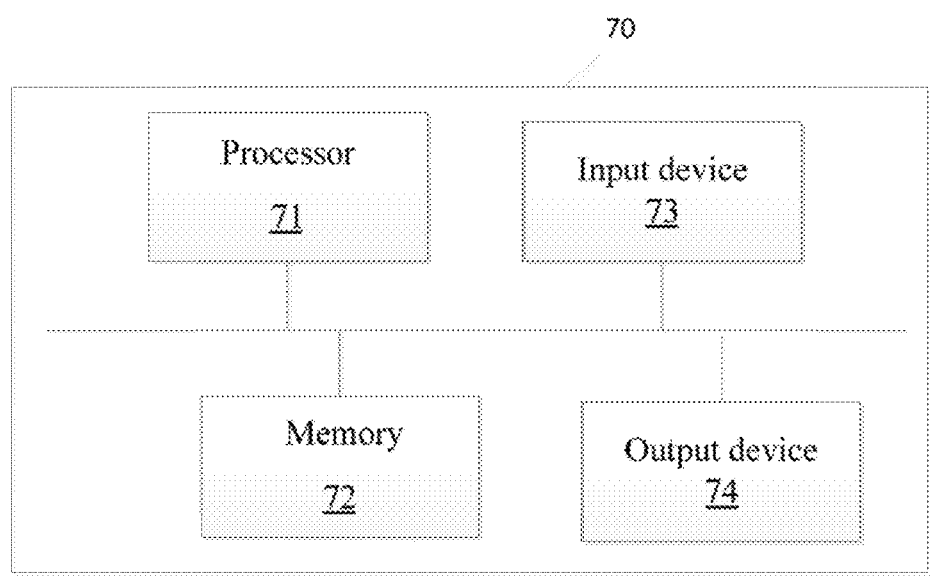
FIG. 7 illustrates a schematic block diagram of a system for demonstrating a function of a vehicle-mounted heads up display.

Another aspect of the present disclosure provides a system for demonstrating a function of a vehicle-mounted heads up display. FIG. 7 illustrates a schematic block diagram of a system 70 for demonstrating a function of a vehicle-mounted heads up display. As shown in FIG. 7, the system may include at least one processor 71 and at least one memory 72 storing a computer program code. The computer program code, when executed by the at least one processor 71, enables the system 70 to perform the steps of the method in FIG. 2. Specifically, the system may set a projection region for displaying a first image, wherein the projection region overlaps a virtual display region of the vehicle-mounted heads up display, obtain relative position and relative size relationships between the projection region and the virtual display region, project the first image in the projection region, wherein the first image includes one or more objects to be marked, capture a second image, wherein the second image is an image of the projection region containing the first image, generate a virtual recognition region in the second image based on the relative position and relative size relationships, determine whether an object in the second image is located within the virtual recognition region, and determine, in a case that the object is located within the virtual recognition region, a first position of the object within the virtual recognition region, determine, based on the first position, a display position of a virtual marker representative of the object within the virtual display region, and display the virtual marker at the display position within the virtual display region.

The processor 71 may be, for example, a central processing unit (CPU), a microprocessor, a digital signal processor (DSP), a processor based on a multi-core processor architecture, and so on. The memory 72 may be any type of memory that is implemented by using a data storage technology, including but not limited to a random access memory, a read-only memory, a semiconductor-based memory, a flash memory, a magnetic disk memory, and so on.

In addition, the system 70 may further include an input device 73, such as a keyboard or a mouse configured to set related parameters and the like. Furthermore, the system 70 may further include an output device 74, such as a display configured to output function demonstration results or related driving information of the vehicle-mounted heads up display, for example, speed, engine revolutions, fuel consumption, tire pressure, navigation, and information of external smart devices.

In some embodiments of the present disclosure, the computer program code, when executed by the at least one processor 71, enables the system 70 to generate a virtual recognition region in the second image by making relative position and relative size relationships between the second image and the virtual recognition region to be the same as the relative position and relative size relationships between the projection region and the virtual display region.

In some embodiments of the present disclosure, shapes of the projection region and the virtual display region are rectangles, a bottom edge of the projection region coincides with a bottom edge of the virtual display region, and a center of the bottom edge of the projection region coincides with a center of the bottom edge of the virtual display region. The computer program code, when executed by the at least one processor 71, enable the system 70 to obtain the relative position and relative size relationships between the projection region and the virtual display region by establishing a first coordinate system such that an abscissa axis of the first coordinate system coincides with the bottom edge of the projection region, and an ordinate axis of the first coordinate system passes through the center of the bottom edge of the projection region, respectively determining coordinates of a first endpoint and a second endpoint of a top edge of the projection region in the first coordinate system, respectively determining coordinates of a third endpoint and a fourth endpoint of a top edge of the virtual display region in the first coordinate system, and determining a ratio r1 of a length of the top edge of the projection region to a length of the top edge of the virtual display region and a ratio r2 of a length of a side edge of the projection region to a length of a side edge of the virtual display region.

The coordinates of the third endpoint and the fourth endpoint of the top edge of the virtual display region are as follows:

$$X_C = -s^*\tan(\alpha/2), Y_C = 2s^*\tan(\beta/2);$$

$$X_D = s^*\tan(\alpha/2), Y_D = 2s^*\tan(\beta/2);$$

wherein $X_C$ and $Y_C$ respectively represent an abscissa and an ordinate of the third endpoint, $X_D$ and $Y_D$ respectively represent an abscissa and an ordinate of the fourth endpoint, s represents a distance from a view window center of the vehicle-mounted heads up display to the projection region, and $\alpha$ and $\beta$ respectively represent a horizontal angle of view and a vertical angle of view of the vehicle-mounted heads up display.

In some embodiments of the present disclosure, the computer program code, when executed by the at least one processor 71, enables the system 70 to generate a virtual recognition region in the second image by establishing a second coordinate system such that an abscissa axis of the second coordinate system coincides with a bottom edge of the second image, and an ordinate axis of the second coordinate system passes through a center of the bottom edge of the second image, determining a pixel distance d1 between two endpoints of a top edge of the second image and a pixel distance d2 between two endpoints of a side edge of the second image, and defining a length of a top edge of the virtual recognition region as d1/r1 and defining a length of a side edge of the virtual recognition region as d2/r2, such that coordinates of two endpoints of the top edge of the virtual recognition region in the second coordinate system are (−d1/2r1, d2/r2) and (d1/2r1, d2/r2) respectively, and coordinates of two endpoints of a bottom edge of the virtual recognition region in the second coordinate system are (−d1/2r1, 0) and (d1/2r1, 0) respectively.

In some embodiments of the present disclosure, a ratio of an abscissa of the display position of the virtual marker in the virtual display region in the first coordinate system to the top edge of the virtual display region is equal to a ratio of an abscissa of the first position in the second coordinate system to the top edge of the virtual recognition region, and a ratio of an ordinate of the display position of the virtual marker in the virtual display region in the first coordinate system to the side edge of the virtual display region is equal to a ratio of an ordinate of the first position in the second coordinate system to the side edge of the virtual recognition region.

In some embodiments of the present disclosure, the first image is an image displaying a road condition.

In some embodiments of the present disclosure, the object includes at least one of a vehicle, a pedestrian, or a guidepost.

Still another aspect of the present disclosure also provides a computer-readable storage medium storing a computer program code. The computer program code, when executed by a processor, carries out steps of the method for demonstrating the function of the vehicle-mounted heads up display as shown in FIG. 2, FIG. 4, and FIG. 6.

The foregoing description of the embodiment has been provided for purpose of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are included within the scope of the disclosure.

What is claimed is:

1. A method for demonstrating a function of a vehicle-mounted heads up display, the method comprising:
setting a projection region for displaying a first image, wherein the projection region overlaps a virtual display region of the vehicle-mounted heads up display;
obtaining relative position and relative size relationships between the projection region and the virtual display region;
projecting the first image in the projection region, the first image comprising one or more objects to be marked in the virtual display region;
capturing a second image, wherein the second image is an image of the projection region containing the first image;
generating a virtual recognition region in the second image based on the relative position and relative size relationships;
determining whether an object in the second image is located within the virtual recognition region, and determining, in a case that the object is located within the virtual recognition region, a first position of the object within the virtual recognition region;
determining, based on the first position, a display position of a virtual marker representative of the object within the virtual display region; and
displaying the virtual marker at the display position within the virtual display region,
wherein generating the virtual recognition region in the second image comprises:
making relative position and relative size relationships between the second image and the virtual recognition region to be the same as the relative position and relative size relationships between the projection region and the virtual display region,
wherein shapes of the projection region and the virtual display region are rectangles, wherein a bottom edge of the projection region coincides with a bottom edge of the virtual display region, wherein a center of the bottom edge of the projection region coincides with a center of the bottom edge of the virtual display region, and wherein obtaining the relative position and relative size relationships between the projection region and the virtual display region comprises:
establishing a first coordinate system such that an abscissa axis of the first coordinate system coincides with the bottom edge of the projection region, and an ordinate axis of the first coordinate system passes through the center of the bottom edge of the projection region;
respectively determining coordinates of a first endpoint and a second endpoint of a top edge of the projection region in the first coordinate system;

respectively determining coordinates of a third endpoint and a fourth endpoint of a top edge of the virtual display region in the first coordinate system; and determining a ratio r1 of a length of the top edge of the projection region to a length of the top edge of the virtual display region and a ratio r2 of a length of a side edge of the projection region to a length of a side edge of the virtual display region, wherein the coordinates of the third endpoint and the fourth endpoint of the top edge of the virtual display region are as follows:

$$X_C = -s*\tan(\alpha/2), Y_C = 2s*\tan(\beta/2); \text{ and}$$

$$X_D = s*\tan(\alpha/2), Y_D = 2s*\tan(\beta/2);$$

wherein $X_C$ and $Y_C$ respectively represent an abscissa and an ordinate of the third endpoint, $X_D$ and $Y_D$ respectively represent an abscissa and an ordinate of the fourth endpoint, s represents a distance from a view window center of the vehicle-mounted heads up display to the projection region, and $\alpha$ and $\beta$ respectively represent a horizontal angle of view and a vertical angle of view of the vehicle-mounted heads up display.

2. The method according to claim 1, wherein generating the virtual recognition region in the second image comprises:

establishing a second coordinate system such that an abscissa axis of the second coordinate system coincides with a bottom edge of the second image, and an ordinate axis of the second coordinate system passes through a center of the bottom edge of the second image;

determining a pixel distance d1 between two endpoints of a top edge of the second image and a pixel distance d2 between two endpoints of a side edge of the second image; and defining a length of a top edge of the virtual recognition region as d1/r1 and defining a length of a side edge of the virtual recognition region as d2/r2, such that coordinates of two endpoints of the top edge of the virtual recognition region in the second coordinate system are (−d1/2r1, d2/r2) and (d1/2r1, d2/r2) respectively, and coordinates of two endpoints of a bottom edge of the virtual recognition region in the second coordinate system are (−d1/2r1, 0) and (d1/2r1, 0) respectively.

3. The method according to claim 2, wherein a ratio of an abscissa of the display position of the virtual marker in the virtual display region in the first coordinate system to the top edge of the virtual display region is equal to a ratio of an abscissa of the first position in the second coordinate system to the top edge of the virtual recognition region, and wherein a ratio of an ordinate of the display position of the virtual marker in the virtual display region in the first coordinate system to the side edge of the virtual display region is equal to a ratio of an ordinate of the first position in the second coordinate system to the side edge of the virtual recognition region.

4. The method according to claim 1, wherein the first image is an image displaying a road condition.

5. The method according to claim 4, wherein the object comprises at least one of a vehicle, a pedestrian, or a guidepost.

6. A non-transitory computer-readable storage medium, storing a computer program code, wherein the computer program code, when executed by a processor, carries out steps of the method for demonstrating the function of the vehicle-mounted heads up display according to claim 1.

7. A system for demonstrating a function of a vehicle-mounted heads up display, the system comprising:

at least one processor; and at least one memory storing a computer program code;

wherein the computer program code, when executed by the at least one processor, enables the system to:

set a projection region for displaying a first image, wherein the projection region overlaps a virtual display region of the vehicle-mounted heads up display;

obtain relative position and relative size relationships between the projection region and the virtual display region;

project the first image in the projection region, the first image comprising one or more objects to be marked in the virtual display region;

capture a second image, wherein the second image is an image of the projection region containing the first image;

generate a virtual recognition region in the second image based on the relative position and relative size relationships;

determine whether an object in the second image is located within the virtual recognition region, and determine, in a case that the object is located within the virtual recognition region, a first position of the object within the virtual recognition region;

determine, based on the first position, a display position of a virtual marker representative of the object within the virtual display region; and display the virtual marker at the display position within the virtual display region, wherein the computer program code, when executed by the at least one processor, enables the system to generate the virtual recognition region in the second image by:

making relative position and relative size relationships between the second image and the virtual recognition region to be the same as the relative position and relative size relationships between the projection region and the virtual display region, wherein shapes of the projection region and the virtual display region are rectangles, wherein a bottom edge of the projection region coincides with a bottom edge of the virtual display region, and wherein a center of the bottom edge of the projection region coincides with a center of the bottom edge of the virtual display region, wherein the computer program code, when executed by the at least one processor, enables the system to obtain the relative position and relative size relationships between the projection region and the virtual display region by:

establishing a first coordinate system such that an abscissa axis of the first coordinate system coincides with the bottom edge of the projection region, and an ordinate axis of the first coordinate system passes through the center of the bottom edge of the projection region;

respectively determining coordinates of a first endpoint and a second endpoint of a top edge of the projection region in the first coordinate system;

respectively determining coordinates of a third endpoint and a fourth endpoint of a top edge of the virtual display region in the first coordinate system; and determining a ratio r1 of a length of the top edge of the projection region to a length of the top edge of the virtual display region and a ratio r2 of a length of a side edge of the projection region to a length of a side edge of the virtual display region, wherein the coordinates of the third endpoint and the fourth endpoint of the top edge of the virtual display region are as follows:

$$X_C=-s*\tan(\alpha/2), Y_C=2s*\tan(\beta/2);\text{ and}$$

$$X_D=s*\tan(\alpha/2), Y_D=2s*\tan(\beta/2);$$

wherein $X_C$ and $Y_C$ respectively represent an abscissa and an ordinate of the third endpoint, $X_D$ and $Y_D$ respectively represent an abscissa and an ordinate of the fourth endpoint, s represents a distance from a view window center of the vehicle-mounted heads up display to the projection region, and α and β respectively represent a horizontal angle of view and a vertical angle of view of the vehicle-mounted heads up display.

8. The system according to claim 7, wherein the computer program code, when executed by the at least one processor, enables the system to generate the virtual recognition region in the second image by:

establishing a second coordinate system such that an abscissa axis of the second coordinate system coincides with a bottom edge of the second image, and an ordinate axis of the second coordinate system passes through a center of the bottom edge of the second image;

determining a pixel distance d1 between two endpoints of a top edge of the second image and a pixel distance d2 between two endpoints of a side edge of the second image; and defining a length of a top edge of the virtual recognition region as d1/r1 and defining a length of a side edge of the virtual recognition region as d2/r2, such that coordinates of two endpoints of the top edge of the virtual recognition region in the second coordinate system are (−d1/2r1, d2/r2) and (d1/2r1, d2/r2) respectively, and coordinates of two endpoints of a bottom edge of the virtual recognition region in the second coordinate system are (−d1/2r1, 0) and (d1/2r1, 0) respectively.

9. The system according to claim 8, wherein a ratio of an abscissa of the display position of the virtual marker in the virtual display region in the first coordinate system to the top edge of the virtual display region is equal to a ratio of an abscissa of the first position in the second coordinate system to the top edge of the virtual recognition region, and wherein a ratio of an ordinate of the display position of the virtual marker in the virtual display region in the first coordinate system to the side edge of the virtual display region is equal to a ratio of an ordinate of the first position in the second coordinate system to the side edge of the virtual recognition region.

10. The system according to claim 7, wherein the first image is an image displaying a road condition.

11. The system according to claim 10, wherein the object comprises at least one of a vehicle, a pedestrian, or a guidepost.

* * * * *